US012420826B1

United States Patent
Sutarwala et al.

(10) Patent No.: US 12,420,826 B1
(45) Date of Patent: Sep. 23, 2025

(54) FAILSAFE CONTROL OF SHARED BACKUP POWER FOR MULTIPLE POWER DOMAINS IN AN AUTONOMOUS VEHICLE

(71) Applicant: Nuro, Inc., Mountain View, CA (US)

(72) Inventors: Quresh Sutarwala, Fremont, CA (US); Paridhi Desai, San Mateo, CA (US); Heba Mustufa, Mountain View, CA (US); Noopur Divekar, Santa Clara, CA (US); Julien Lambert, Mountain View, CA (US); Albert Ng, Cupertino, CA (US); Michael Lepkowski, Plymouth, MI (US)

(73) Assignee: NURO, INC., Mountain View, CA (US)

( * ) Notice: Subject to any disclaimer, the term of this patent is extended or adjusted under 35 U.S.C. 154(b) by 302 days.

(21) Appl. No.: 17/958,997

(22) Filed: Oct. 3, 2022

Related U.S. Application Data

(60) Provisional application No. 63/251,450, filed on Oct. 1, 2021.

(51) Int. Cl.
*B60W 60/00* (2020.01)
*B60W 10/30* (2006.01)

(52) U.S. Cl.
CPC .......... *B60W 60/001* (2020.02); *B60W 10/30* (2013.01); *B60W 2510/0666* (2013.01)

(58) Field of Classification Search
CPC ..................... B60W 10/30; B60W 2510/0666
See application file for complete search history.

(56) References Cited

U.S. PATENT DOCUMENTS

| | | | |
|---|---|---|---|
| 10,946,865 B1* | 3/2021 | Lin ................... | B60W 50/0205 |
| 2019/0210547 A1* | 7/2019 | Khafagy .............. | H02J 7/1423 |
| 2020/0180653 A1* | 6/2020 | Chi ................. | B60W 60/00182 |
| 2020/0223383 A1* | 7/2020 | Awad Alla ........... | B60W 10/20 |
| 2021/0237667 A1* | 8/2021 | Zheng ................... | B60W 20/50 |
| 2021/0247760 A1* | 8/2021 | Kusama ................. | B60L 3/003 |
| 2022/0169870 A1 | 6/2022 | Viitanen et al. | |
| 2022/0185115 A1 | 6/2022 | Divekar et al. | |

\* cited by examiner

*Primary Examiner* — Khoi H Tran
*Assistant Examiner* — Tristan J Greiner
(74) *Attorney, Agent, or Firm* — Edell, Shapiro & Finnan, LLC

(57) ABSTRACT

An autonomous vehicle can include multiple low voltage power domains. Each low voltage power domain can comprise a low voltage power distribution unit (LVPDU). An LVPDU can include a failsafe switch that can selectively couple or de-couple the low voltage power domain from a shared backup low voltage power source, which can be configured to concurrently supply backup power multiple low voltage power domains or LVPDUs. A first LVPDU of a first low voltage power domain can generate a control signal to control the failsafe switch of a second LVPDU of the second low voltage power domain to disconnect the second low voltage power domain from the shared low voltage backup power source, and vice versa.

18 Claims, 9 Drawing Sheets

FAILSAFE CONTROL OF SHARED BACKUP POWER FOR MULTIPLE POWER DOMAINS IN AN AUTONOMOUS VEHICLE

CROSS REFERENCE TO RELATED APPLICATION

This application claims the benefit of Provisional U.S. Application Ser. No. 63/251,450, filed on Oct. 1, 2021, and titled "FAILSAFE CONTROL OF SHARED BACKUP POWER FOR MULTIPLE POWER DOMAINS IN AN AUTONOMOUS VEHICLE"; the aforementioned priority application being hereby incorporated by reference in its entirety.

TECHNICAL FIELD

The disclosure relates to autonomous vehicles. More specifically, the disclosure relates to power control and regulation of components of an autonomous vehicle.

BACKGROUND

The use of autonomous vehicles is growing. Autonomous vehicles may operate autonomously or in a semi-autonomous manner. For instance, autonomous vehicles may operate under the control of an autonomy system, or under the control of a remote operator, as for example via a teleoperations system. To enable autonomous vehicles to operate safely, systems of the autonomous vehicle that support control by an autonomy system and/or support control by a remote operator must generally be robust and provide redundancy. Providing robustness and redundancy generally includes provide backup systems such as backup power systems.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
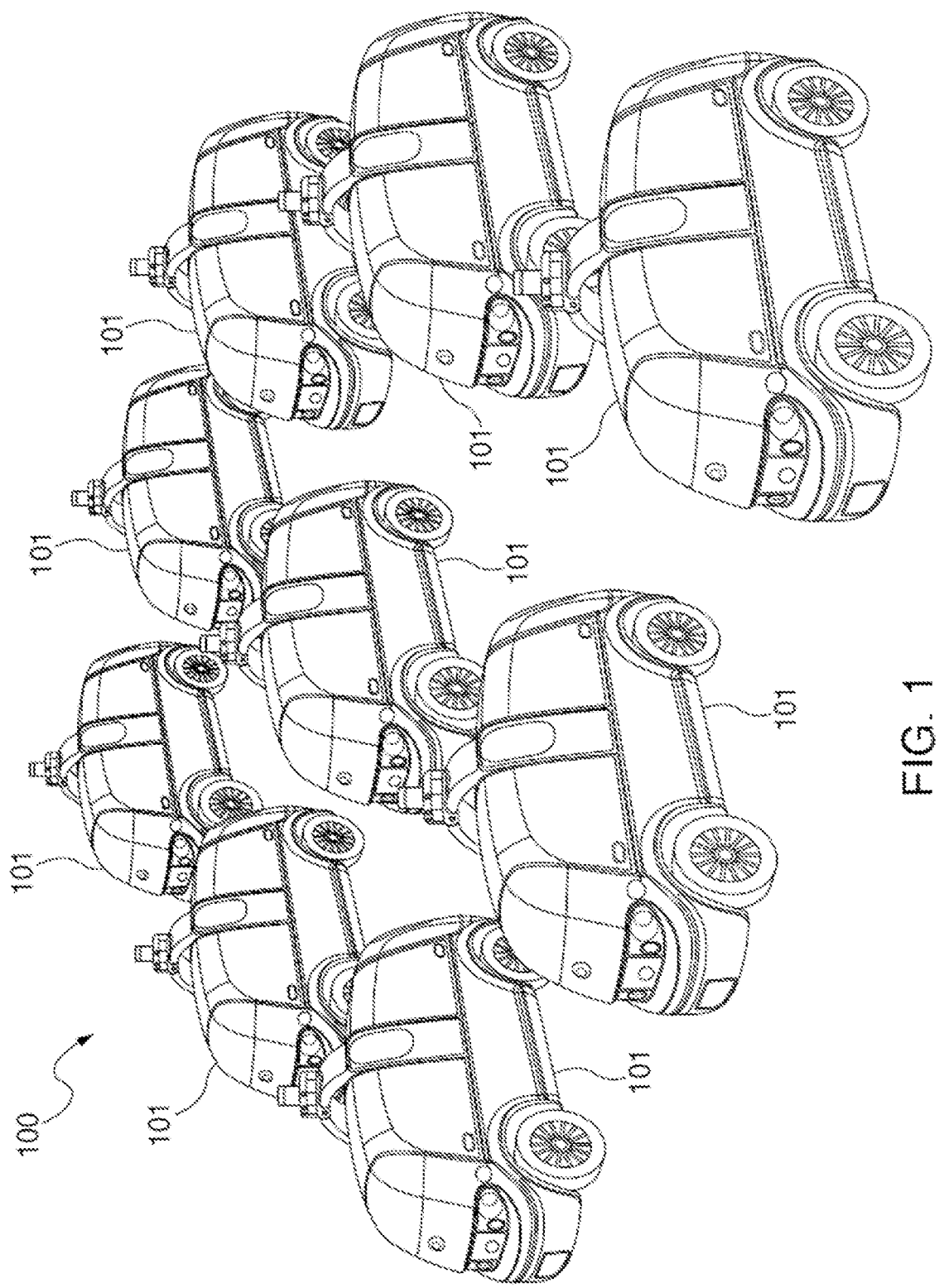
FIG. 1 is a diagrammatic representation of an autonomous vehicle fleet in accordance with an embodiment.

According to one embodiment, an autonomous vehicle comprises multiple low voltage power domains. Each of the multiple low voltage power domains may be powered independently via a corresponding low voltage power distribution unit (LVPDU). During normal operations of the autonomous vehicle, an LVPDU may supply power to a corresponding one of the multiple low voltage power domains using power from a primary power source (e.g., power converted to low voltage from a high voltage power source by one or more DC-DC converters). The autonomous vehicle may also include a backup power source (e.g., a low voltage backup battery) that provides backup power to at least two of the low voltage power domains in the event of a failure of the primary power source (or a failure of the DC-DC converters). Each of the LVPDUs of the autonomous vehicle may include one or more failsafe switches to selectively couple or decouple the LVPDU from the backup power source. Furthermore, a given LVPDU of the autonomous vehicle can be configured to detect issues relating to the performance and condition of at least one other LVPDU of the autonomous vehicle to control the failsafe switch of the at least one other LVPDU to decouple the at least one other LVPDU in response to the detection of such issues. For instance, a first failsafe switch coupling a first LVPDU to the backup low voltage power source may be controlled by a second LVPDU and a second failsafe switch coupling the second LVPDU to the backup low voltage power source may be controlled by the first LVPDU. In this manner, when mission critical low voltage components of the autonomous vehicle are running on the backup power source, a failure in one of the low voltage power domains may be safely and quickly isolated from the other low voltage power domains, thereby preventing a wider and more serious failure in the systems of the autonomous vehicle. Furthermore, this enables multiple low voltage power domains in the autonomous vehicle to safely share a single backup power source, thereby reducing weight, cost, and complexity of the autonomous vehicle.

According to another embodiment, a vehicle comprises a first power distribution unit configured to distribute power to a first set of vehicle components within a first voltage domain, a second power distribution unit configured to distribute power to a second set of vehicle components within a second voltage domain, and a shared backup battery configured to concurrently supply backup power to the first power distribution unit and to the second power distribution unit. While the shared backup battery concurrently supplies backup power to the first power distribution unit and to the second power distribution unit, the first power distribution unit is configured to generate a first control signal to selectively decouple the second power distribution unit from the shared backup battery and the second power distribution unit is configured to generate a second control signal to selectively decouple the first power distribution unit from the shared backup battery.

According to another embodiment, a computer-implemented method comprises monitoring, by a first power distribution unit of a vehicle, conditions associated with a second power distribution unit of the vehicle and monitoring, by the second power distribution unit, conditions associated with the first power distribution unit. The first power distribution unit is configured to supply power to a first set of vehicle components within a first voltage domain and the second power distribution unit is configured to supply power to a second set of vehicle components within a second voltage domain. The method further comprises detecting, by the first power distribution unit, a first fault associated with the second power distribution unit, and, in response to detecting the first fault associated with the second power distribution unit, generating, by the first power distribution unit, a control signal to decouple the second power distribution unit from a shared backup battery.

According to yet another embodiment, a first power distribution unit configured to distribute power to a first set of electrical components within a first voltage domain, the first power distribution unit comprises control circuitry, power regulation circuitry, and a failsafe switch configured to receive a first control signal to selectively decouple the first power distribution unit from a shared battery, the shared battery concurrently supplying power to the first power distribution unit and to a second power distribution unit. The control circuitry is configured to detect one or more fault conditions associated with the second power distribution unit and is further configured to, in response to detecting the one or more fault conditions, generate a second control signal to selectively decouple the second power distribution unit from the shared battery.

DESCRIPTION

Autonomous vehicles, which may include fully autonomous or semi-autonomous vehicles, generally include hardware systems which support the ability for vehicles to operate substantially in a driverless manner, e.g., without drivers onboard the vehicles. Such hardware may be arranged substantially within a vehicle, and may include hardware and/or software that facilitates the operation of systems within the vehicle.

The hardware may include at least one system which is powered, at least in part, using a low voltage power supply. In one embodiment, a low voltage power supply may be configured as a low voltage power distribution unit (LVPDU). Such an LVPDU may receive power from at least a primary power source, such as from a high voltage battery via a DC-DC converter, and a backup which may provide low voltage power to a system of an autonomous vehicle in the event that the power source is not functioning or not fully functioning.

As used herein, "low voltage" may refer to a wide range of voltages. In certain implementations, low voltage may be any voltage that is less than 50 volts (e.g., 12V, 48V, etc.). The terms "low voltage" and "high voltage" may also simply refer to voltage ranges relative to each other (e.g., low voltage can refer to any voltage in the 0V to 60V voltage range while high voltage can refer to any voltage above 60V). Furthermore, a power domain can refer to a collection of components that are powered by the same power supply. In the context of a low voltage power domain, the collection of components within the low voltage power domain can each receive power from the same low voltage power distribution unit (LVPDU).

In various embodiments, the autonomous vehicle may comprise a plurality of power domains. The components and systems on-board the autonomous vehicle may be primarily powered, directly or in-directly, by a high voltage power source such as a high voltage battery. The high voltage battery can directly (e.g., without DC-DC voltage conversion) power a set of components, such as the vehicle's drivetrain, battery cooling system, that are a part of a high-voltage power domain. The high voltage battery can also indirectly supply power to low voltage power domains by way of one or more DC-DC converters that converts the high voltage power supplied by the high voltage battery to low voltage power.

According to embodiments, the autonomous vehicle may include a plurality of low voltage power domains. Depending on the particular implementation, each of the plurality of low voltage power domains may operate at substantially the same voltage level (e.g., 12V). In other implementations, normal operating voltage levels may differ across the low voltage power domains (e.g., 6V and 12V). A first set of components of the autonomous vehicle can be considered as in a separate power domain compared to a second set of components due to the first set of components being powered by a different power supply (e.g., a first LVPDU) as compared to the second set of components (e.g., a second LVPDU).

An autonomous vehicle that includes hardware which supports autonomy and other functions, as well as an LVPDU, may generally be part of a fleet of vehicles. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
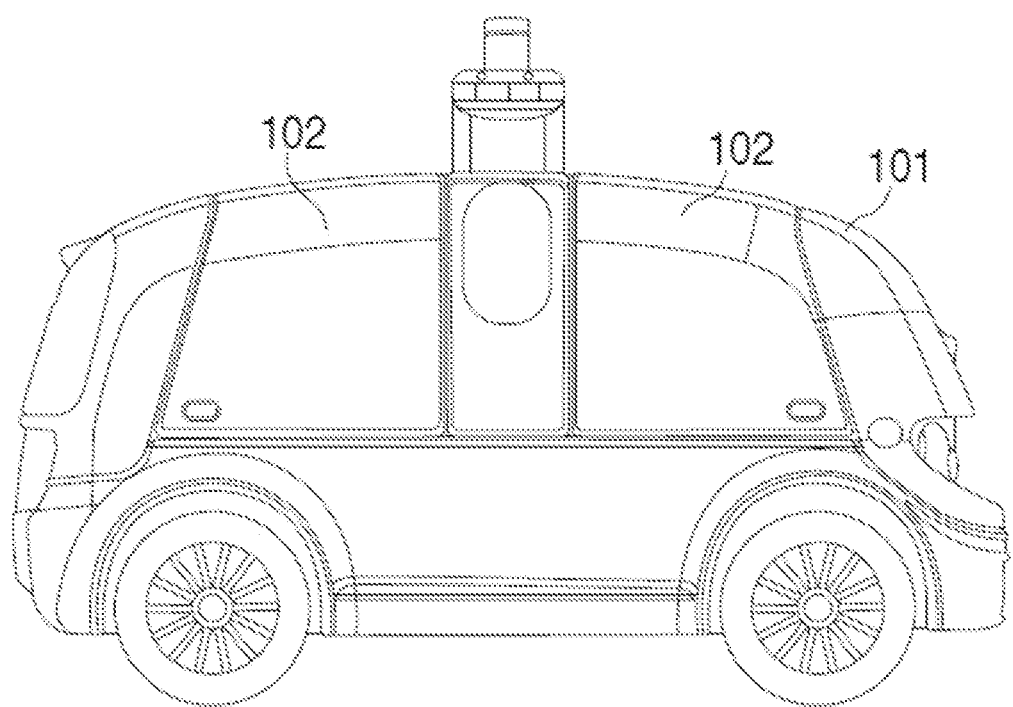
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
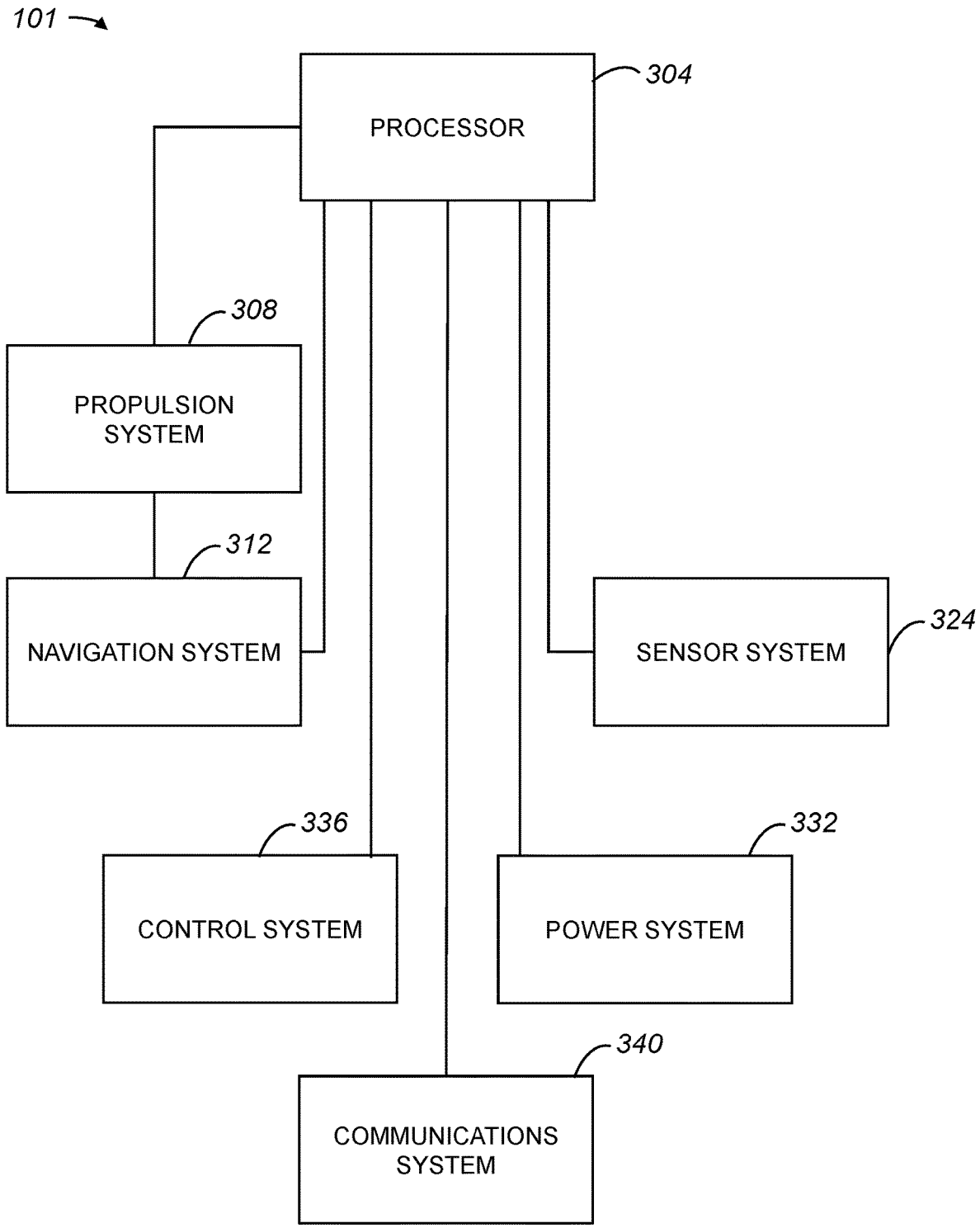
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels. Data collected by sensor system 324 may be used by a perception system associated with navigation system 312 to determine or to otherwise understand an environment around autonomous vehicle 101.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336. Components of propulsion system 308, navigation system 312, sensor system 324, power system 332, and control system 336 may effectively form a perception system that may create a model of the environment around autonomous vehicle 101 to facilitate autonomous or semi-autonomous driving.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

In general, processor 304, propulsion system 308, navigation system 312, sensor system 324, power system 332, control system 336, and communications system 340 may include hardware and software components. That is, the functionality of systems of autonomous vehicle 101 may be embodied as hardware and software components.

Figure 4:
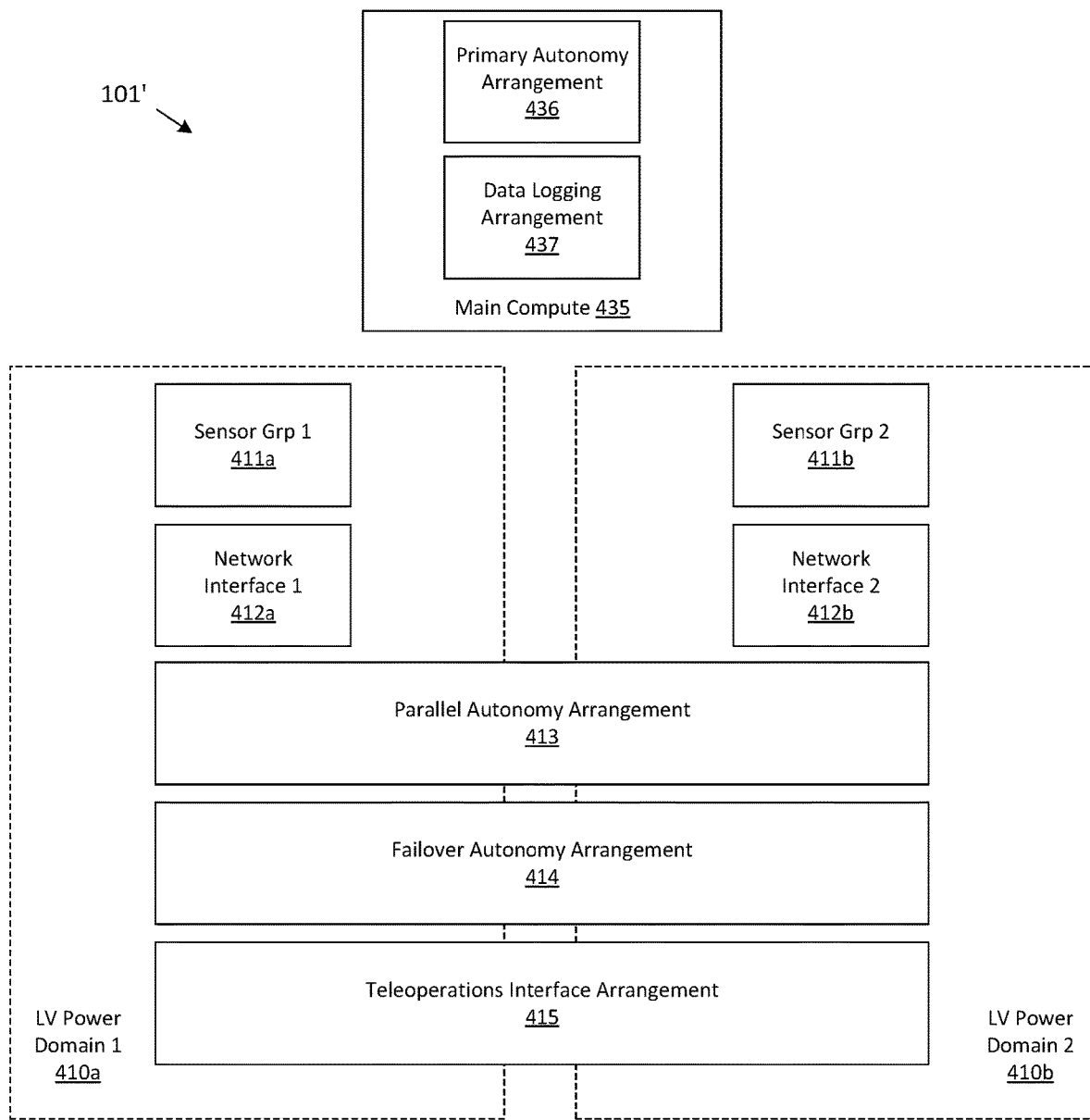
FIG. 4 is a block diagram representation of components of an exemplary autonomous vehicle comprising at least two multiple low voltage domains, in accordance with an embodiment.

FIG. 4 is a block diagram representation of components of an exemplary autonomous vehicle comprising at least two low voltage domains, in accordance with an embodiment. Autonomous vehicle 101' can include, but is not limited to including, a first low voltage power domain 410a and a second low voltage power domain 410b. The autonomous vehicle 101' can further include a main compute 435. Main compute 435 may generally include a primary autonomy arrangement 436 and a data logging arrangement 437. Primary autonomy arrangement 436 generally includes components, e.g., hardware components and/or software components, which allow a vehicle such as vehicle 101' of FIG. 4 to operate autonomously. Primary autonomy arrangement 436 may be configured to support autonomous driving at substantially any level defined by the Society of Automotive Engineers (SAE), as for example at Level 3 with conditional driving automation, Level 4 with high driving automation, and/or Level 5 with full driving automation. Data logging arrangement 437 may include memory which stores data collected as vehicle 101' of FIG. 4 operates. Such data may include, but is not limited to including, perception data and autonomy data. Data logging arrangement 437 may be configured as a removable storage drive or as a memory from which data may be downloaded, as for example over a wireless connection or over a wired connection such as an Ethernet connection. It should be appreciated that data logging arrangement 437 may include an input/output port which enables data to be offloaded. In the exemplary embodiment illustrated in FIG. 4, the main compute 435 is shown to be configured to be outside of the first and second low voltage domains 410a and 410b, but it is understood that the main compute 435 can be configured to be powered using either a high voltage power domain, the first and/or second low voltage power domains 410a and/or 410b, and/or a separate low voltage power domain of the autonomous vehicle.

The first low voltage power domain 410a and the second low voltage power domain 410b can each be powered by a respective low voltage power distribution unit (LVPDU). As a result, components within the first voltage power domain 410a can be powered on or off separately and/or independently from components in the second low voltage power domain 410b. In various embodiments, the components, signal lines, and power lines within the first low voltage power domain 410a can be arranged in a manner to reduce crosstalk and signal interference with the second low voltage power domain 410b, and vice versa. In other words, the first low voltage power domain 410a can be designed to be isolated from the second low voltage power domain 411b such that when either of the two low voltage power domains 410a or 410b is powered off or has faulted, the other can remain functional.

The first low voltage power domain 410a of the autonomous vehicle 101' can include a first sensor group 411a and a first network interface 412a. Similarly, the second low voltage power domain 410b of the autonomous vehicle 101' can include a second sensor group 411b and a second network interface 412b. The first and second sensor groups 411a and 411b can include a plurality of sensors to enable the primary autonomy arrangement 436 to perform functions to operate autonomous vehicle 101' in an autonomous or semi-autonomous manner. The first and second sensor groups 411a and 411b can each include one or more of cameras, thermal image sensors (e.g., infrared cameras), light ranging and detection sensors (lidars), radars, ultrasonic sensors, and the like.

In certain embodiments, the first sensor group 411a and the second sensor group 411b are designed, configured, and/or arranged in a manner to provide resilience, functionality, and/or redundancy in the event of a failure with one of the low voltage power domains 410a and 410b. Sensors of the autonomous vehicle 101' can be divided between the two low voltage power domains 410a and 410b (e.g., into the first sensor group 411a and the second sensor group 411b) to ensure that even if one of the low voltage power domains (and its associated sensors) fails, the sensors associated with the other of the two low voltage power domains powers can enable primary autonomy arrangement 436 (or parallel autonomy arrangement 415 or failover autonomy arrangement) to successfully perform functions to continue operating the autonomous vehicle 101' in an autonomous or semi-autonomous manner or to bring the autonomous vehicle 101' to a safe stop. According to one aspect, the sensors of the autonomous vehicle 101' can be divided between the two low voltage power domains 410a and 410b based on their respective types (e.g., camera, lidar, radar, etc.). As one example, the autonomous vehicle 101' may be equipped with two lidar sensors and one of the two lidar sensors can be powered via the first low voltage power domain 410a and the second of the two lidar sensors can be powered via the second low voltage power domain 410b. In this manner, if one of the two low voltage power domains fails, the lidar sensor powered by the still-functional power low voltage domain can remain operational to provide lidar data. In another aspect, the sensors of the autonomous vehicle 101' can also be divided between the two low voltage power domains based on their respective capabilities or functionalities (e.g., long-range sensing vs short-range sensing, high-resolution sensing vs low-resolution sensing). As another example, the autonomous vehicle 101' may be equipped with a short range lidar sensor, a long range lidar sensor, a short-range radar, and a long-range radar sensor. The autonomous vehicle 101' can be configured such that the short range lidar and the long-range radar are powered by the first low voltage power domain 410a and the long range lidar and the short-range radar are powered by the second low voltage power domain 410b. In this manner, both power domains include at least one sensor having long-range detection capability and at least one sensor having short-range detection capability. In yet another aspect, the sensors of the autonomous vehicle 101' can be divided between the low voltage power domains 410a and 410b to maximize the field of view of each of the sensor groups 411a and 411b. In other words, the sensors can be arranged between the first sensor group 411a and the second sensor group 411b to minimize or eliminate the blind zone of each of the sensor groups 411a and 411b in terms of sensing and detection capability.

The first network interface 412a and the second network interface 412b can comprise circuitry and components to enable the vehicle 101' to communicate with one or more servers over a data network. The network interfaces 412a and 412b can comprise, for example, one or more cellular radios and modems which support communications over wireless networks (e.g., 3G, 4G, LTE, 5G, 6G networks). The network interfaces 412a and 412b can communicate with the one or more servers over the wireless networks for a variety of purposes including but not limited to uploading data, retrieving or downloading data, and supporting teleoperations. Uploading data may including uploading sensor data, vehicle telemetry data, vehicle status information, etc. The uploaded data may be used, for example, to train machine-learned models for operating the primary autonomy arrangement 436, to enable the one or more servers to determine and maintain real-time status of the autonomous vehicle 101', etc. Retrieved or downloaded data may include map data, real-time traffic data, trip information, navigation data, etc. And supporting teleoperations may include transmitting camera or video data to enable presentation of real-time video feeds to a remote teleoperations operator to enable the teleoperations operator to monitor the autonomous vehicle and/or receiving commands or controls to enable the teleoperations operator to remotely control the autonomous vehicle if or when necessary. Depending on the particular implementation, the network interfaces 412a and 412b can be configured to communicate concurrently over separate or distinct wireless communication links or over separate data networks to improve data bandwidth and throughput. For example, carrier aggregation may be implemented. Furthermore, network interfaces may establish wireless data links with different wireless service providers (e.g., multi-cellular service provider aggregation) to improve coverage, bandwidth, and throughput, and reduce or minimize wireless dead zones. In other implementations, one of the network interfaces 412a and 412b can function as the primary network interface while the other serves as the backup. In yet another implementation, the network interfaces 412a and 412b can be enabled or disabled (e.g., put into a standby mode) based on the wireless data signal conditions and data throughput of each of the network interfaces 412a and 412b. In yet further implementations, the network interfaces (e.g., cellular or satellite modems) onboard the autonomous vehicle may be prioritized in terms of data transmission and reception based on historical and/or real-time performances (e.g., signal strength, throughput, packet drop-rate, etc.) of the network interfaces and/or the wireless data links.

The autonomous vehicle 101' can further include a parallel autonomy arrangement 413, which can perform at least a subset of the functions (or substantially the same functions) performed by the primary autonomy arrangement 436. In one embodiment, the parallel autonomy arrangement 413 can be configured to execute in parallel with the primary autonomy arrangement 436 and can take over control of the autonomous vehicle 101' in the event of an issue with the primary autonomy arrangement 436. Although the example illustrated in FIG. 4 shows the parallel autonomy arrangement 413 as being implemented outside the main compute 435, it is understood that in certain implementations, the parallel autonomy arrangement 436 can be implemented by the main compute 435. The autonomous vehicle 101' can also include a failover autonomy arrangement 414, which may be configured to substantially institute failover measures in the event of an issue that prevents the primary autonomy arrangement 436 and/or the parallel autonomy arrangement 413 from controlling the autonomous vehicle 101'. For example, failover autonomy arrangement 414 may cause the autonomous vehicle 101' to make a safe stop (e.g., pull over on the side of the road) if the vehicle is unable to safely operate under autonomy, e.g., in an autonomous mode or state.

The autonomous vehicle 101' can additionally include teleoperations interface arrangement 415, which can be configured to enable communications between a teleoperations system and autonomous vehicle 101'. Teleoperations interface arrangement 415 may provide camera streams, or data streams from cameras (e.g., cameras within the first and second sensor groups 411a and 411b), to a teleoperations system or a system which may remotely operate autonomous vehicle 101'. In one embodiment, teleoperations interface arrangement 415 includes hardware and/or software which process data obtained from cameras, enables a remote teleoperator to control vehicle operations, and may support communications with the remote teleoperator through network interfaces 412a and 412b. By way of example, one or more radios and modems included in network interfaces 412a and 412b may be used by teleoperations interface arrangement 415 to allow for communications between teleoperations interface arrangement 415 and a teleoperations system. Such communications may generally include, but are not limited to including, sending data streams from cameras to a teleoperations system and receiving control commands from the teleoperations system to control the autonomous vehicle 101'.

In the example illustrated in FIG. 4, the parallel autonomy arrangement 413, failover autonomy arrangement 414, and teleoperations interface arrangement 415 is each shown to span both the first low voltage power domain 410a and the second low voltage power domain 410b. This can be used to refer to, for example, each of these elements being configured to receive power from either the first low voltage power domain 410a or the second low voltage power domain 410b, or both. In the event of an issue with one of the power domains, each of these elements (or at least some components of each of these elements) can be powered by the other power domain and can retain at least a subset of its normal operation functionalities. In one embodiment, the parallel autonomy arrangement 413 can, for example, selectively receive power from either the first low voltage power domain 410a or the second low voltage power domain 410b so as to remain operational during an outage relating to one of the two low voltage power domains. In addition or as an alternative, the parallel autonomy arrangement 413, for example, can be implemented by a plurality of components, a first set of which are powered by the first low voltage power domain 410a and a second set of which are powered by the second low voltage power domain 410b. The parallel autonomy arrangement 413 can be configured in such a manner such that, in the event of an outage of the first low voltage power domain, the second set of components can perform at least a subset of functionalities to enable the parallel autonomy arrangement 413 to operate autonomous vehicle 101'. In one implementation, the parallel autonomy arrangement 413 and the failover autonomy arrangement 414 can be implemented by four general-purpose processors or systems on a chip (SoCs) and two of the SoCs can be powered via the first low voltage power domain 410a and two of the SoCs can be powered via the second low voltage power domain 410b.

Figure 5:
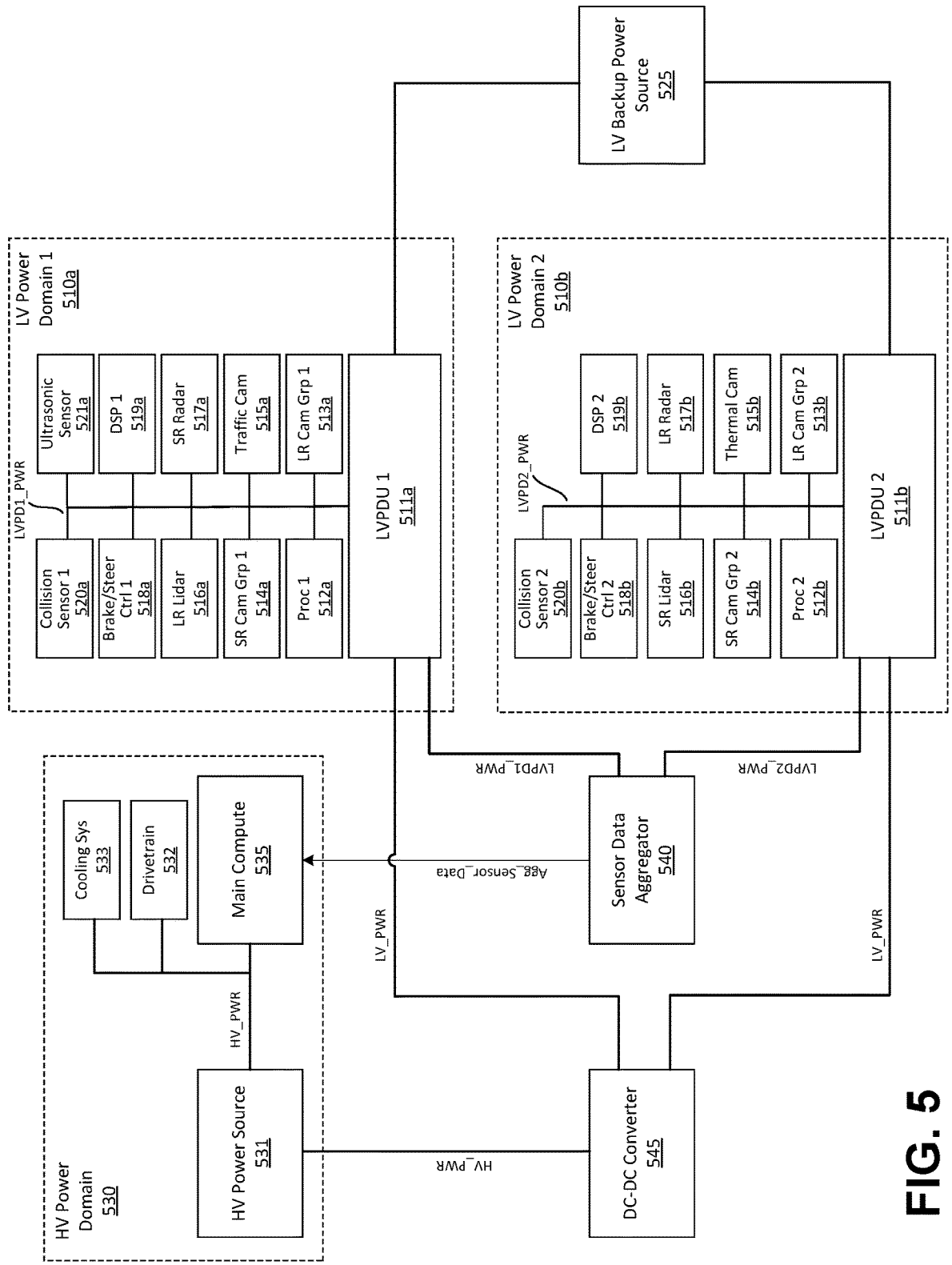
FIG. 5 is another block diagram illustrating components of an exemplary autonomous vehicle, in accordance with an embodiment.

FIG. 5 is another block diagram illustrating components of an exemplary autonomous vehicle, in accordance with an embodiment. FIG. 5 can be a more detailed illustration of the components depicted in FIG. 4. For instance, the low voltage power domains 410a and 410b of FIG. 4 can correspond to low voltage power domains 510a and 510b, respectively. And the main compute 435 of FIG. 4 can correspond to main compute 535 of FIG. 5.

In the example illustrated in FIG. 5, an autonomous vehicle (e.g., such as autonomous vehicle 101' of FIG. 4) can comprise a first low voltage power domain 510a, a second low voltage power domain 510b, a high voltage power domain 530. The high voltage power domain 530 can be powered by a high voltage power source 531, which can be a high voltage battery on-board the autonomous vehicle. The high voltage power source 531 can provide high voltage power (HV_PWR) to the drivetrain 532 and cooling system 533 of the autonomous vehicle and a main compute 535. The cooling system 533 can be configured to, for example, cool components on-board the autonomous vehicle, including the high voltage power source 531, the drivetrain 532, and the main compute 535. The main compute 535 can be configured to implement a broad set of functions to control the autonomous vehicle, including for example, autonomously operating and navigating the vehicle (e.g., in accordance with Level 4 or Level 5 autonomous driving). For instance, as described with respect to FIG. 4, the main compute 535 can implement primary autonomy arrangement 436 of FIG. 4 to control the autonomous vehicle. And although illustrated in FIG. 5 as part of the high voltage power domain 530, the main compute 535 can be instead part of a low voltage power domain (e.g., a third low voltage power domain (not shown) separate from the first and second low voltage domains 510a and 510b). In certain embodiments, parts or components of the high voltage power domain 535 can be powered, either entirely or partially, by low voltage power supplied by one or more of the low voltage power domains 510a and/or 510b. For instance, one or more of a vehicle controller (e.g., a brainstem computer or BSC), the main compute 535, and/or the drivetrain 532 can receive low voltage power from one or more of the low voltage power domain 510a and/or 510b.

The autonomous vehicle can include a DC-DC converter 545 that can convert high voltage power from the high voltage power source 531 to a lower voltage power (LV_PWR). This lower voltage power can be supplied to the low voltage power domains 510a and 510b and can be the input power to these power domains during normal operations of the autonomous vehicle. Although FIG. 5 illustrates that a single DC-DC converter 545 is coupled to both the first low voltage power domain 510a and the second low voltage power domain 510a, it may be appreciated that separate DC-DC converters may be used to power the low voltage domains 510a and 510b. In this manner, during normal operations of the autonomous vehicle (e.g., operations without failures or errors in any of the power domains such as high voltage power domain 530 and low voltage power domains 510a and 510b).

The first low voltage power domain 510a can include a first low voltage power distribution unit (LVPDU) 511a, which can be configured to receive the converted low voltage power (LV_PWR) from the DC-DC converter 545 to supply low voltage power (LVPD1_PWR) to each of the components with the first low voltage power domain 510a. Among other functionalities, the first LVPDU 511a can be configured to regulate the low voltage power that it supplies within the first low voltage power domain 510a, detect power error conditions or failures (e.g., a short circuit, voltage irregularities, etc.), and isolate the detected power error conditions or failures to prevent wider outages of autonomous vehicle system components. For instance, the first LVDPU 511a can be configured to isolate an individual component or a set of components within the first low voltage power domain 510a if it detects that the component(s) are drawing an abnormal amount of current. Furthermore, the first LVDPU 511a can be configured to selectively disconnect the first power domain 510a from the LV_PWR output by the DC-DC converter 545 by way of a primary power switch (not shown in FIG. 5). The first LVPDU 511a can do so in response to detected irregularities the LV_PWR output by the DC-DC converter 545. Once disconnected from LV_PWR, the components in the first low voltage power domain 511a can continue to operate using low voltage power supplied by a low voltage backup power source 525 (e.g., a 12V backup battery). The first LVPDU 511a can also comprise a failsafe switch (not shown in FIG. 5) to selectively connect or disconnect the first power domain from the low voltage backup power source 525. The second low voltage power domain 510b can similarly include a second LVPDU 511b, which can be substantially similar to the first LVPDU 511a. In particular, the second LVPDU 511b may comprise a failsafe switch (not shown in FIG. 5) to selectively connect or disconnect the second power domain from the low voltage backup power source 525. In some examples, the first low voltage power domain 510a and the second low voltage power domain 510b can have the same operating voltage (e.g., 12V). In other examples, the two power domains can operate on different voltages. Additional details relating to example implementations of the LVPDU 511a and 511b are described with respect to FIG. 6.

Components of the autonomous vehicle that are within the first low voltage power domain 511a can include processor(s) 512a, a first group of long-range cameras 513a, a first group of short-range cameras 514a, a traffic camera 515a, a long-range lidar sensor 516a, a short-range radar sensor 517a, a first set of brake and steering controls 518a for the autonomous vehicle, a first digital signal processor (DSP), a first collision sensor 520a, and an ultrasonic sensor 521a. Components of the autonomous vehicle that are within the second low voltage power domain 511b can include processor(s) 512b, a second group of long-range cameras 513b, a second group of short-range cameras 514b, a thermal camera 515b (e.g., infrared camera), a short-range lidar sensor 516b, a long-range radar sensor 517b, a second set of brake and steering controls 518b for the autonomous vehicle, a second digital signal processor (DSP), and a second collision sensor 520b.

Referring back to FIG. 4, the sensors within the first low voltage power domain 510a (e.g., the first group of long-range cameras 513a, the first group of short-range cameras 514a, etc.) can comprise the first sensor group 411a of FIG. 4 and the sensors within the second low voltage power domain 510b (e.g., the second group of long-range cameras 513b, the second group of short-range cameras 514b, etc.) can comprise the second sensor group 411b of FIG. 4. As described herein the first sensor group 411a and the second sensor group 411b can be arranged such that either of the two sensor groups can provide sufficient sensor data regarding the surroundings of the vehicle to enable the vehicle to operate (e.g., continue autonomous driving operations, operate via a teleoperations interface, make a safe stop, etc.) if one of the two low voltage power domains fails. To that end, the sensors of the autonomous vehicle can be divided between the two low voltage power domains 510a and 510b based on their respective types (e.g., lidar vs radar vs camera, etc.), capabilities (e.g., short-range vs long range sensing capability, high-resolution vs low-resolution sensing capability, etc.), and fields of view. For instance, as illustrated in FIG. 5, the first sensor group includes long-range lidar 516a and short-range radar 517a while the second sensor group includes short-range lidar 516b and long-range radar 517b.

The autonomous vehicle can further include a sensor data aggregator 540 for processing and aggregating the sensor data (e.g., camera data) collected by the sensors on-board the autonomous vehicle. The sensor data aggregator 540 can transmit or relay the aggregated sensor data (Agg_Sensor_Data) to the main compute 535 and/or the processor(s) 512a and 512b. According to one aspect, the sensor data aggregator 540 can be configured to, for example, combine images captured by the various cameras on-board the autonomous vehicle (e.g., by timestamping the images and stitching the images captured at the same time by different cameras) to enable the main compute 535 to perform autonomy operations or to enable the vehicle to be operated via teleoperations. The sensor data aggregator 540 can be powered by the first low voltage power domain 510a, the second low voltage power domain 510b, or both. In one implementation, the sensor data aggregator 540 may comprise two portions, a first portion powered by the first low voltage power domain 510a and a second portion powered by the second low voltage power domain 510b. The first portion may comprise one or more processors and network interfaces (e.g., for communicating with one or more servers to enable teleoperations) and the second portion may similarly comprise one or more processors and network interfaces.

Referring back again to FIG. 4, the sensor data aggregator 540 and/or processor(s) 512a and 512b can together implement the parallel autonomy arrangement 413, the failover autonomy arrangement 414, and/or the teleoperations interface arrangement 415 of FIG. 4. In certain examples, the processors within the sensor data aggregator 540 and/or processor(s) 512a and 512b can be systems on chip (SoC) platforms that include general-purpose compute cores (CPU cores), graphical process units (GPUs), and cellular connectivity circuitry and radios (e.g., for implementing the network interfaces 412a and 412b of FIG. 4).

Figure 6:
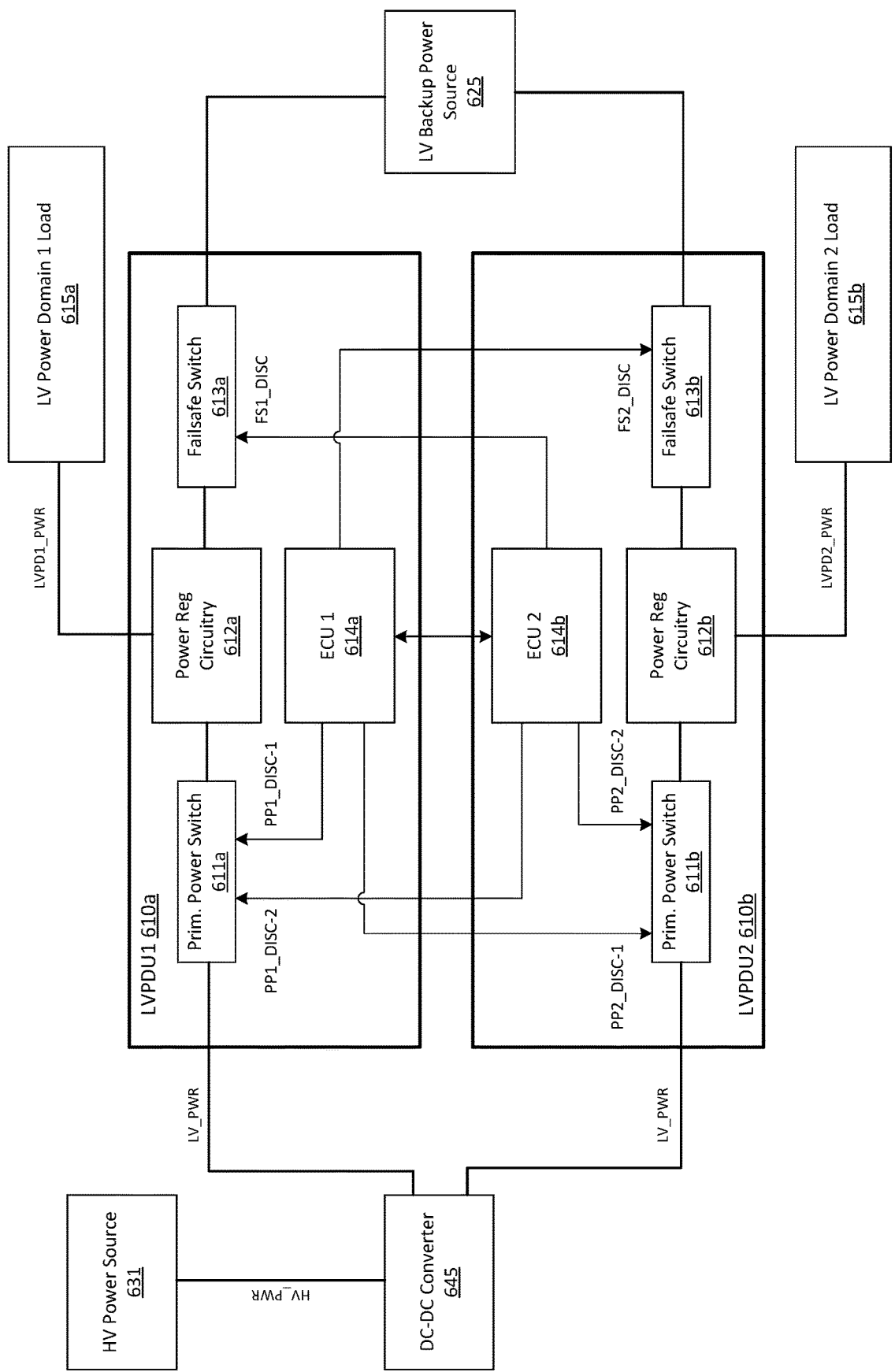
FIG. 6 is another block diagram illustrating components of an exemplary autonomous vehicle, in accordance with an embodiment.

FIG. 6 is another block diagram illustrating components of an exemplary autonomous vehicle, in accordance with an embodiment. The autonomous vehicle, such as autonomous vehicle 101' of FIG. 4, can include a high voltage power source 631, a DC-DC converter 645, a first LVPDU 610a, a second LVPDU 610b, and a low voltage backup power source 625. The components illustrated in FIG. 6 can be referenced with respect to those illustrated in FIG. 5. For instance, the first low voltage power domain load 615a can correspond to components within the first low voltage power domain 510a such as processor(s) 512a, the first group of long-range cameras 513a, etc. Similarly, the second low voltage power domain load 615b can correspond to components within the second low voltage power domain 510b such as processor(s) 512b, the second group of long-range cameras 513b, etc. At a high level, the low voltage backup power source 625 may be configured to concurrently supply backup power to the first LVDPU 610a and the second LVDPU 610b. In particular, the low voltage backup power source 625 may be configured to do so in the event of a fault or error associated with the high voltage power source 631 and/or the DC-DC converter 645.

The high voltage power source 631 can be a high voltage battery (e.g., a 350V battery) that can serve as the autonomous vehicle's primary power source. The high voltage power (HV_PWR) supplied by the high voltage power source 631 can be converted to lower voltages for use by low voltage power domains by way of one or more DC-DC converters 645, which can output a low voltage power (LV_PWR).

In an example, the first LVPDU 610a can include a primary power switch 611a, power regulation circuitry 612a, a failsafe switch 613a, and an error control unit (ECU) 614a. The second LVPDU 610b and its components can be configured substantially similarly as compared to the first LVPDU 610a. For instance, the second LVPDU 610b can similarly include a primary power switch 611b, power regulation circuitry 612b, a failsafe switch 613b, and an ECU 614b.

With respect to the first LVPDU 610a, the primary power switch 611a can couple the first LVPDU 610a to the output of the DC-DC converter 645 to receive LV_PWR. The power regulation circuitry 612a receive the LV_PWR and generate a low voltage power signal (LVPD1_PWR) for powering components of the first low voltage power domain (e.g., first low voltage power domain load 615a or referring to FIG. 5, for example, processor(s) 512a, the first long-range camera group 513a, etc.). Depending on the implementation, the power regulation circuitry 612a can be configured to, for example, regulate the current and voltage of LVPD1_PWR. In certain examples, the power regulation circuitry 612a can be configured to selectively turn off power to an individual component (e.g., a camera, a digital signal processor, etc.) within the first low voltage power domain based on detected power irregularities of that individual component (e.g., abnormally high current draw, etc.). In addition, the failsafe switch 613a can couple the first LVDPU 613a to the low voltage backup power source 625.

According to embodiments, the primary power switch 611a can be closed by default to enable the DC-DC converter 645 to supply low voltage power to the first LVPDU 610a. Similarly, the failsafe switch 613a can be closed by default to couple the first LVPDU 610a to the low voltage backup power source 625 (e.g., a 12V battery) to enable the low voltage backup power source 625 to be charged. When errors, abnormalities, or failures are detected, the primary power switch 611a and/or the failsafe switch 613a can be opened to enable failover operations and/or prevent wider failures of components of the autonomous vehicle. For instance, during normal operations (e.g., when the autonomous vehicle, including its high voltage power domain(s) and low voltage power domain(s), is operating using power supplied by the high voltage power source), the primary power switch 611a of the first LVDPU 610a can be closed to couple the first LVPDU 610a to the DC-DC converter 645 and the DC-DC converter 645 can supply low voltage power to the first low voltage power domain. In the event that the first low voltage power domain needs to be switched to backup power, the primary power switch 611a can be opened and the low voltage backup power source 625 can supply low voltage power to the first LVPDU 610a. And, while the first low voltage power domain is operating under backup power and in response to errors within the first low voltage power domain being detected, the failsafe switch 611a can be opened to prevent the failures from affecting other low voltage power domains powered by the low voltage backup power source 625.

According to embodiments, the ECU 614a of the first LVPDU 610a can be configured to monitor various operating conditions within the high voltage power domain, the first low voltage power domain, and the second low voltage power domain to control at least the primary power switch 611a of the first LVPDU 610a and the failsafe switch 613b of the second LVPDU 610b. Similarly, the ECU 614b of the second LVPDU 610b can control at least the primary power switch 611b of the second LVPDU 610b and the failsafe switch 613a of the first LVPDU 610a. In the example illustrated in FIG. 6, the first ECU 614a can generate one or more of: (i) control signal PP1_DISC-1 to disconnect the primary power switch 611a of the first LVPDU 610a from the DC-DC converter 645, (ii) control signal PP2_DISC-1 to disconnect the primary power switch 611b of the second LVDPU 610b from the DC-DC converter 645, and (iii) control signal FS2_DISC to disconnect the failsafe switch 613b of the second LVPDU 610b from the low voltage backup power source 625. Similarly, the second ECU 614b can generate one or more of: (i) control signal PP1_DISC-2 to disconnect the primary power switch 611a of the first LVPDU 610a from the DC-DC converter 645, (ii) control signal PP2_DISC-2 to disconnect the primary power switch 611*b* of the second LVDPU 610*b* from the DC-DC converter 645, and (iii) control signal FS1_DISC to disconnect the failsafe switch 613*a* of the first LVPDU 610*a* from the low voltage backup power source 625. In one or more embodiments, the first and second ECU's 614*a* and 614*b* can establish a communication link to exchange sensor data and status information. The communication link can be implemented as, for example, an I2C bus, a controller area network (CAN) bus, and the like.

Figure 7:
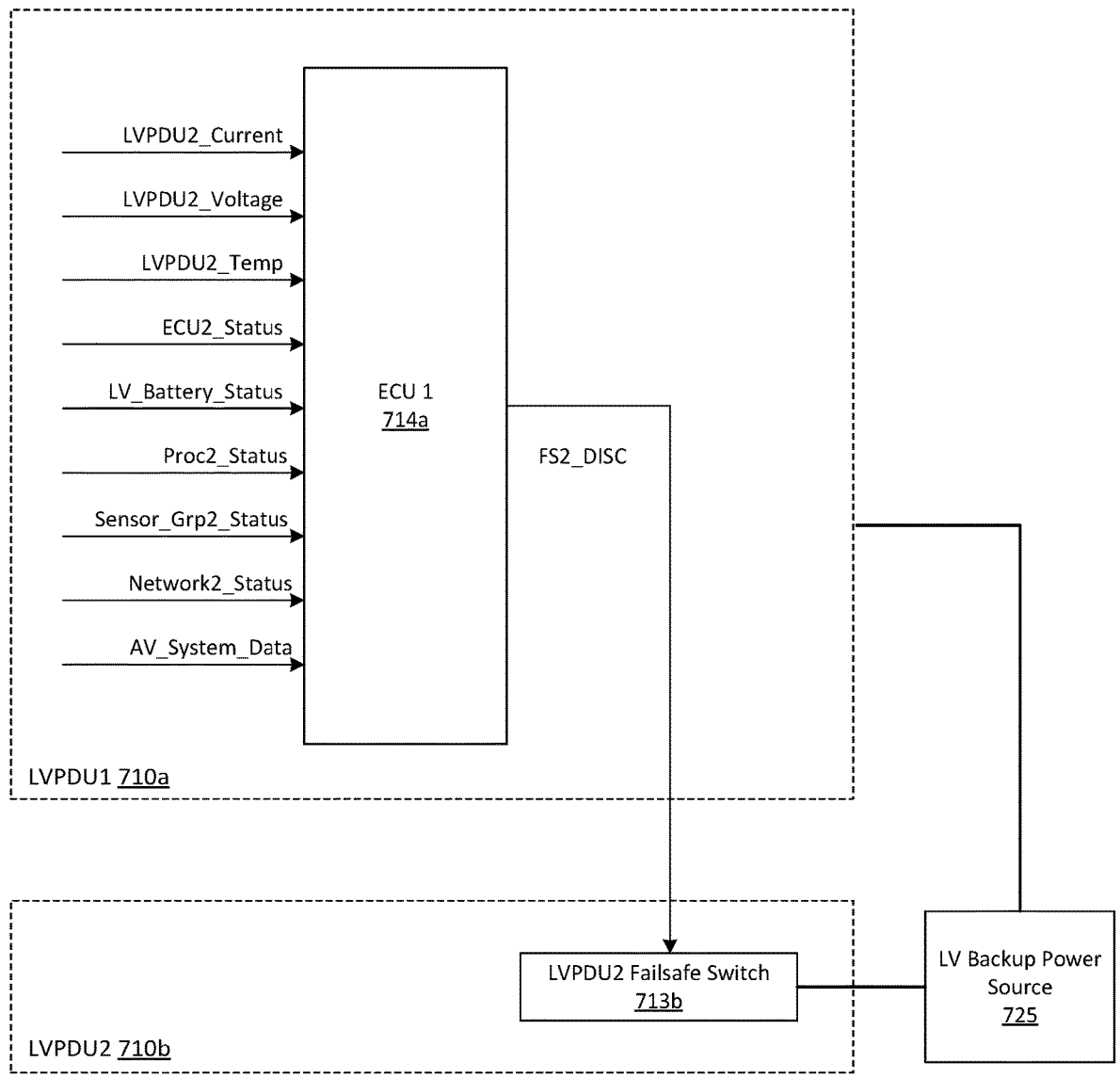
FIG. 7 is a block diagram illustrating an example error control unit (ECU) that controls a failsafe switch of an autonomous vehicle, in accordance with an example.

FIG. 7 is a block diagram illustrating an example error control unit (ECU) that controls a failsafe switch of an autonomous vehicle, in accordance with an example.

A first LVDPU 710*a* can include an ECU 714*a* that generates a control signal FS2_DISC to control a failsafe switch 713*b* of a second LVPDU 710*b*. The first LVDPU 710*a* and the second LVPDU 710*b* can both be coupled to a low voltage backup power source 725 that provides backup low voltage power to both LVPDUs. To control the failsafe switch 713*b*, the ECU 714*a* can receive and monitor various sensor data and information. For example, ECU 714*a* can generate the control signal FS2_DISC based at least in part on one or more of: (i) output current of the second LVPDU (LVPDU2_Current), (ii) output voltage of the second LVPDU (LVPDU2_Voltage), (iii) a temperature of the second LVPDU (LVPDU2_Temp), (iv) a status signal received from the ECU (not shown) of the second LVPDU (ECU2_Status), (v) a status or information relating to the low voltage battery (LV_Battery_Status), (vi) a status or information relating to the processor(s) (e.g., processor(s) 512*b* of FIG. 5) in the second low voltage power domain (Proc2_Status), (vii) a status or information relating to the sensors (e.g., second sensor group 411*b* of FIG. 4) of the second low voltage power domain (Sensor_Grp2_Status), (viii) a status or information relating to the wireless communication link maintained by the network interface (e.g., second network interface 412*b* of FIG. 4) of the second low voltage power domain (Network2_Status), (ix) a status, data, or instruction from an autonomy system of the vehicle such as from the primary autonomy arrangement, the parallel autonomy arrangement, or from the failover autonomy arrangement (AV_System_Data), etc. In particular, FS2_DISC signal may be generated in response to a detecting a fault condition associated with the second power distribution unit or with the second voltage domain. Detecting the fault condition may include detecting one or more of an abnormal current condition (e.g., overcurrent), an abnormal temperature condition (e.g., over-temperature), an abnormal voltage condition (e.g., undervoltage or overvoltage), or a short circuit condition.

While one or more low voltage power domains of the vehicle is powered by the low voltage backup power source 725, the ECU 714*a* can intelligently disconnect (e.g., open) the failsafe switch 713*b* in response to one or more of these signals to, for example, conserve battery charge in the low voltage backup power source 725 based on the needs of the autonomy systems of the vehicle and the status of the vehicle. For instance, ECU 714*a* can disconnect the failsafe switch 713*b* in response to determining that sensors in the second low voltage power domain are damaged or have failed (e.g., via signal Sensor_Grp2_Status). In response, the ECU 714*a* can disconnect the failsafe switch 713*b* to power down the second low voltage power domain to reduce power draw from the low voltage backup power source 725.

Figure 8:
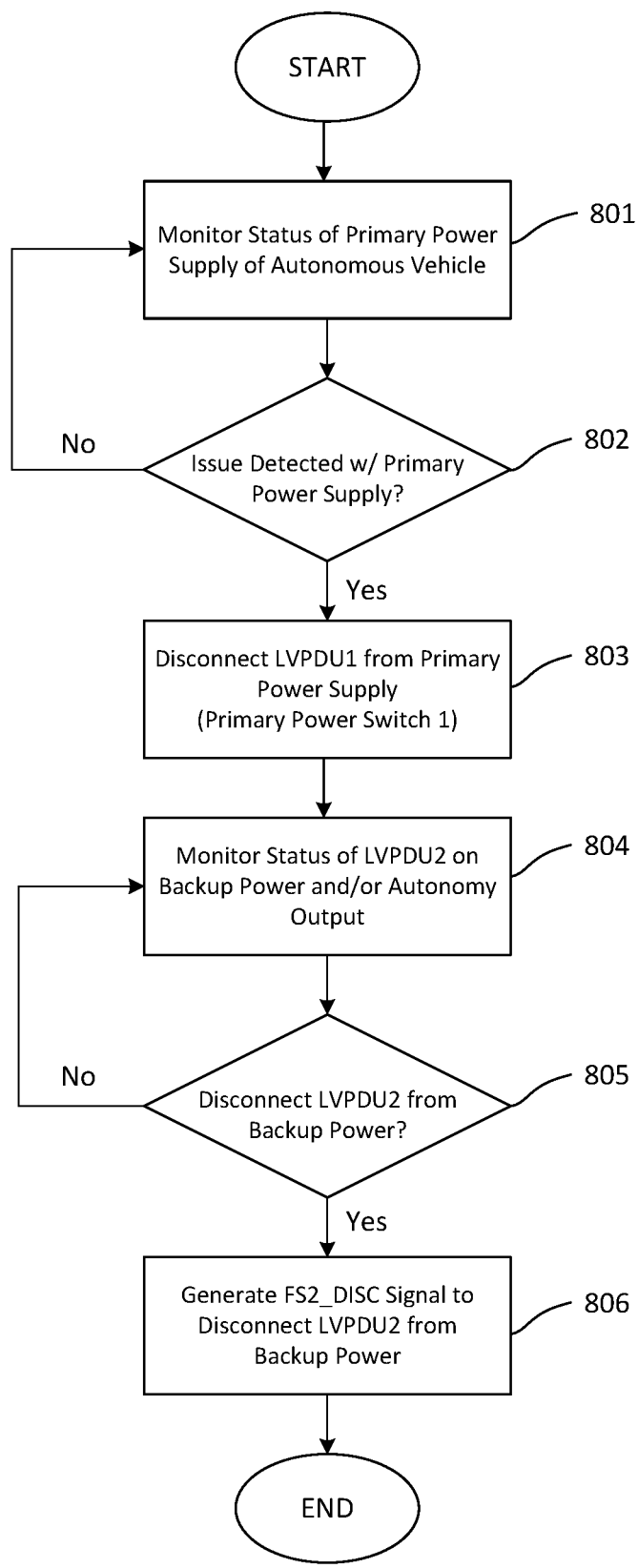
FIG. 8 is a flowchart diagram illustrating an example method that can be performed by an error control unit (ECU) of a low voltage power distribution unit, in accordance with an embodiment.

FIG. 8 is a flowchart diagram illustrating an example method that can be performed by an error control unit (ECU) of a low voltage power distribution unit, in accordance with an embodiment. In the below description of FIG. 8, references may be made to earlier figures, such as FIG. 6. For instance, the method illustrated in FIG. 9 may be performed by the ECU 614*a* or ECU 614*b* of FIG. 6.

At step 801, the ECU 614*a* monitors the health of the primary power source (e.g., high voltage power source 631 of FIG. 6) of the autonomous vehicle. The ECU 614*a* can monitor various parameters and/or indicators including, but not limited to, the voltage and/or current output by the primary power source, the remaining charge level of the primary power supply, the voltage and/or current output by a DC-DC converter (e.g., DC-DC converter 645 of FIG. 6), the temperature of components in the high voltage power domain (e.g., the high voltage battery temperature) and/or the DC-DC converter, etc.

At step 802, the ECU 614*a* can determine, based on the monitoring, whether there is an issue with the primary power source and/or other components that may require the first LVPDU 610*a* to switch the first low voltage power domain to run on backup battery power. If there is no issue detected, the ECU 614*a* can continue to monitor the various parameters and the low voltage power domain can continue operating under normal conditions.

If errors or failures are detected that require the first LVDPU 610*a* to be de-coupled from the primary power source, the ECU 614*a* can, at step 803, generate a signal (e.g., PP1_DISC-1) to open the primary power switch and disconnect the first low voltage power domain from the high voltage power source. The first low voltage power domain and the first LVPDU 610*a* can operate on the power supplied by the backup low voltage power source.

At steps 804 and 805, while the low voltage power source is operating on the power supplied by the backup low voltage power source, the ECU 614*a* of the first LVPDU 610*a* can monitor various parameters and indicators to determine whether to de-couple the second LVPDU 610*b* and the second low voltage domain from the backup low voltage power source. Among other parameters, the ECU 614*a* can monitor parameters and/or indicators relating to the health of the second low voltage power domain including, but not limited to, the voltage and/or current output by the second LVPDU 610*b*, the voltage and/or current through the second failsafe switch 613*a*, temperature(s) of one or more components in the second low voltage power domain (e.g., a temperature reading from a temperature sensor associated with the second LVPDU 610*b*, etc.), the remaining charge level of the backup power supply, and the like. The ECU 614*a* can further monitor various signals and data relating to the autonomy performance or functions of the autonomous vehicle (e.g., data or output from the failover autonomy arrangement 414, operating status of the sensors in the first and second low voltage power domains, etc.) to selectively de-couple the second LVPDU 610*b* and the second low voltage power domain from the backup power source. In certain examples, the parallel autonomy arrangement 413 or the failover autonomy arrangement 414 (e.g., as implemented by processor(s) 512*a* and/or processor(s) 512*b* of FIG. 5) can make determinations to de-couple one of the low voltage power domains from the low voltage backup power source.

At step 806, if it is determined that the second LVPDU 610*b* is to be de-coupled from the low voltage power source, the ECU 614*a* of the first LVPDU 610*a* can generate a signal such as FS2_DISC signal illustrated in FIG. 6 to cause the failsafe switch to open and disconnect the second LVPDU 610*b* from the backup low voltage power source.

Figure 9:
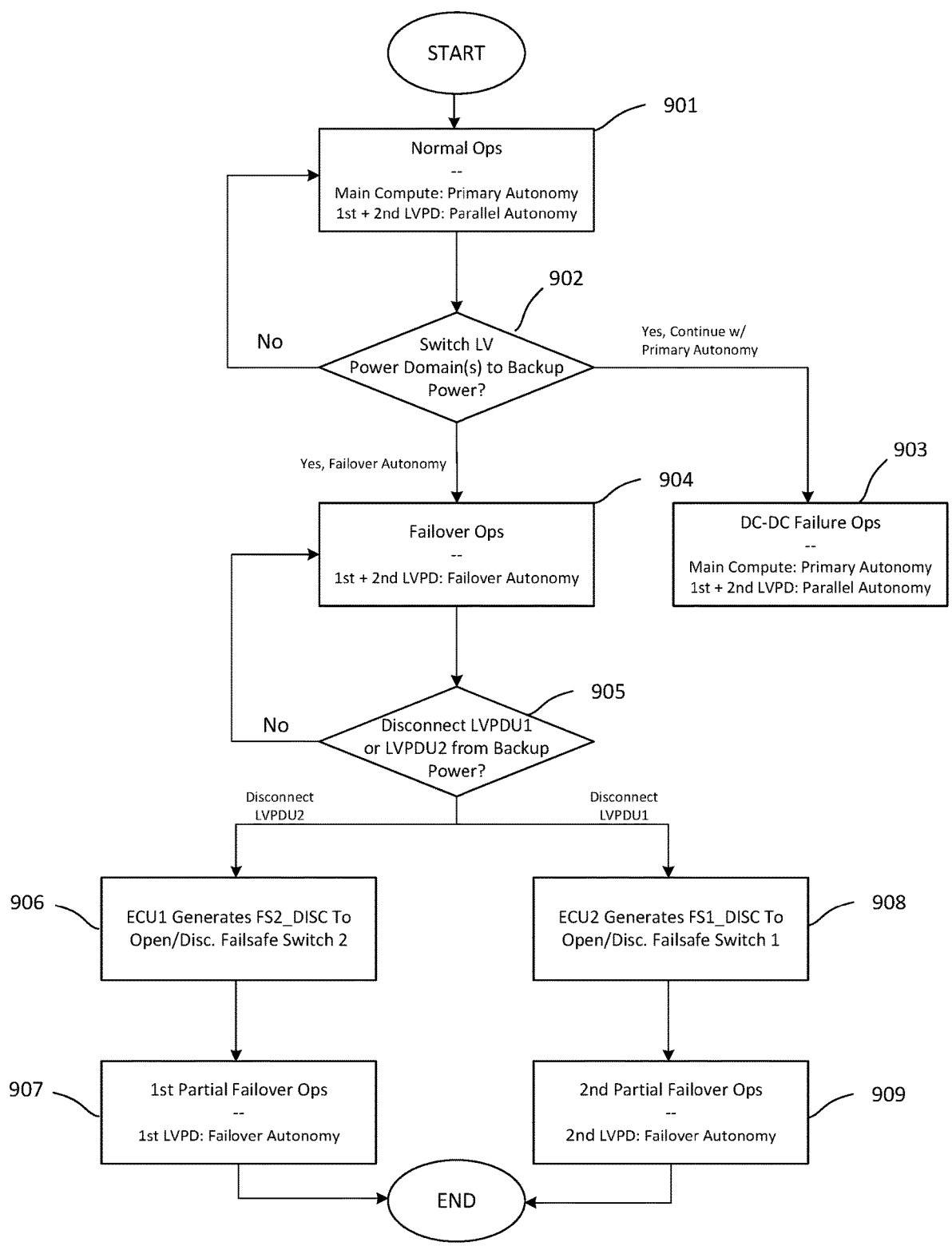
FIG. 9 is a flowchart diagram illustrating an example method that can be performed an autonomous vehicle, in accordance with an embodiment.

FIG. 9 is a flowchart diagram illustrating an example method that can be performed an autonomous vehicle, in accordance with an embodiment.

At step 901, the autonomous vehicle can proceed under a normal operations mode. For instance, the main compute of the autonomous vehicle can implement the primary autonomy arrangement (e.g., primary autonomy arrangement 436 of FIG. 4), which can control navigation, steering, acceleration, and braking of the autonomous vehicle. Concurrently, processors (e.g., processors 512a and/or 512b of FIG. 5), in the low voltage domains of the autonomous vehicle can implement a parallel autonomy arrangement (e.g., parallel autonomy arrangement 413) that can take over the control of the autonomous vehicle from the primary autonomy arrangement if needed. Under some circumstances, the parallel autonomy arrangement can override the output from the primary autonomy arrangement and to avoid critical safety events such as crashes. In certain embodiments, the parallel autonomy arrangement can also be implemented by the main compute of the autonomous vehicle. During normal operations, the low voltage power domains of the vehicle can be powered by a high voltage power source (e.g., high voltage power source 531 or 631 of FIGS. 5 and 6, respectively) such as a high voltage battery via, for example, a DC-DC converter (e.g., DC-DC converter 545 or 645 of FIGS. 5 and 6, respectively).

At step 902, the autonomous vehicle can determine whether to cause at least one of the low voltage power domains of the autonomous vehicle to switch to being run on backup power, such as a low voltage backup battery. The autonomous vehicle can continuously monitor its systems and components when operating on in the normal operations mode to make this determination. For instance, characteristics that can indicate that the high voltage power source and/or the DC-DC converter have failed or about to fail or enter a condition that render them unable to supply the power required for the low voltage power domains can be monitored. More specifically, in some examples, the output voltage and/or current of the DC-DC converter and the temperatures of the high voltage power supply and/or the DC-DC converter can be monitored.

At step 903, the autonomous vehicle can switch one or more of the low voltage power domains to be run on backup power and continue to implement the primary autonomy arrangement in a DC-DC failure operations mode. The autonomous vehicle can enter this mode of operation in response to a determination at step 902 that there exists an issue with converting high voltage power to the low voltage power needed by the low voltage power domains. For instance, one or more DC-DC converters of the autonomous vehicle may have failed or is about to fail. In this mode, one or more of the low voltage power domains can be run on the backup low voltage battery while the high voltage power domain can continue to operate similarly as compared to the normal operation mode of the autonomous vehicle. For instance, the main compute can continue to implement the primary autonomy arrangement to control the vehicle and the first and second low voltage power domains can continue to support the parallel autonomy arrangement. In certain embodiments, the LVDPUs of the low voltage power domains can be switched to power one or more components in the high voltage power domain to enable the high voltage power domain to continue to operate despite the failure of one or more DC-DC converters.

As an alternative to entering the DC-DC failure operations mode at step 903, the autonomous vehicle can enter a failover operations mode at step 904. At step 904, the autonomous vehicle can enter a failover operations mode. The autonomous vehicle can enter this mode of operation in response to a determination at step 902 that the high voltage power domain or one or more components therein (e.g., primary power source, main compute, etc.) can fail. In this mode, the main compute is unavailable to implement the primary autonomy arrangement and the first and second low voltage power domains support the implementation of a failover autonomy arrangement (e.g., 414 of FIG. 4) to control the vehicle (e.g., bring the vehicle to a safe stop) and/or a teleoperations interface arrangement (e.g., 415 of FIG. 4) to enable a remote operator to assume control of the vehicle. According to one aspect, the autonomous vehicle can transition to the failover autonomy arrangement and/or the teleoperations interface arrangement can be triggered to transition in response to the one or more low voltage power domains being switched to being powered by the low voltage backup battery (e.g., in response to the PP1_DISC-1 signal in FIG. 6 generated by the ECU 614a of the first LVPDU to disconnect the DC-DC converter 645 from the LVDPU 610a and the first low voltage power domain, etc.).

While under failover autonomy operations, each ECU of each LVPDU can, at step 905, monitor for conditions of the other low voltage power domain(s) to determine whether to disconnect the other low voltage power domain(s) from the low voltage backup battery.

For instance, if the second LVPDU 610b is to be disconnected from the low voltage backup battery, the first ECU 614a of the first LVPDU 610a can, at step 906, generate a control signal (e.g., FS2_DISC) to open the failsafe switch of the second LVPDU 610b and disconnect the second LVPDU 610b and the second low voltage power domain from the backup low voltage battery. At step 907, the failover autonomous vehicle operations can continue operating in a first partial failover operations mode using components within the first low voltage power domain. In particular, the failover autonomy arrangement can be implemented using only the processor(s) in the first low voltage power domain and relying on sensor data generated by the sensors in the first low voltage power domain. In this mode of operation, the failover autonomy arrangement can analyze sensor data using a different set of models as compared with the failover operations mode in step 904. For instance, in the first partial failover operations mode, the failover autonomy arrangement can utilize a set of models that has been specifically trained or adapted to be used to control the vehicle based on sensor data received from the sensors powered by the first low voltage domain (e.g., sensor group 1 of FIG. 4).

If the first LVPDU 610a is to be disconnected from the low voltage backup battery, the second ECU 614b of the second LVPDU 610b can, at step 908, generate a control signal (e.g., FS1_DISC) to open the failsafe switch of the first LVPDU 610a and disconnect the first LVPDU 610a and the first low voltage power domain from the backup low voltage battery. At step 909, the failover autonomous vehicle operations can continue operating using components within the second low voltage power domain. In particular, the failover autonomy arrangement can be implemented using only the processor(s) in the second low voltage power domain and relying on sensor data generated by sensors in the second low voltage power domain. Similar to the first failover operations mode, the failover autonomy arrangement in the second partial failover mode can utilize a set of models that has been specifically trained or adapted to be used to control the vehicle based on sensor data received from the sensors powered by the second low voltage power domain (e.g., sensor group 2 of FIG. 4).

Although only a few embodiments have been described in this disclosure, it should be understood that the disclosure may be embodied in many other specific forms without departing from the spirit or the scope of the present disclosure. By way of example, although a power source of an LVPDU has generally been described as being a DC-DC converter, it should be appreciated that a power source is not limited to being a DC-DC converter. A power source may generally be any type of electric power converter which may be sufficient to provide low voltage power sufficient for use by systems of an autonomous vehicle. In one embodiment, a power source may be an electrical circuit or device configured to convert a source of direct current from a first voltage level to a second voltage level.

In general, an amount of voltage considered to be "low" may vary widely. For instance, low voltage may be any voltage that is less than approximately fifty volts. While an LVPDU has been described as distributing low voltage power, an LVPDU may be arranged to provide any amount or level of voltage that may be used by systems of an autonomous vehicle.

An LVPDU may include components which have not been shown above, e.g., in FIG. 6, for ease of illustrations. Such components may include, but are not limited to including, voltage regulators, voltage sensors, current sensors, and switches. For example, an LVPDU can be configured to detect or measure a current drawn by an individual component (e.g., a long-range lidar) using a current sense amplifier and can cause the switch providing power to the individual component to be opened in response to detecting an overcurrent or short circuit condition for the individual component.

An LVPDU may effectively be powered by substantially any power source associated with an autonomous vehicle. For example, a DC-DC converter that supplies low voltage power to an LVPDU may draw power from a main power supply (e.g., a high-voltage power source) of the autonomous vehicle. It should be understood, however, that an LVPDU is not limited to being powered by the main power supply of an autonomous vehicle—as described herein, an LVPDU may be configured to receive power from a backup battery.

In some embodiments, there may effectively be at least three low voltage power domains in an autonomous vehicle. In one such an embodiment, the first and second low voltage power domains can be similar to examples described with respect to FIG. 6. In particular, the first and second low voltage power domains can each power a respective set of safety critical components of the autonomous vehicle and can share a low voltage backup battery that powers one or both of the power domains when the primary power source of the autonomous vehicle is unable or unsuitable for powering the low voltage power domains. For example, the backup battery may concurrently supply power to both a first LVPDU and a second LVPDU in the event that the primary power source and/or the DC-DC converter of the vehicle are unable to supply power to the first and second LVDPUs. And the LVPDU of the first low voltage power domain can include logic and circuitry to control a failsafe switch that couples the LVPDU of the second low voltage power domain to the backup low voltage power source, and vice versa. The third low voltage power domain may essentially be an approximately twelve volt base, and may be a power domain for non-safety critical peripherals of the autonomous vehicle. In another such an embodiment, three low voltage domains can each be similar to examples described with respect to FIG. 6. In particular, each of the three low voltage domains can power a respective set of safety critical components of the autonomous vehicle and can share a low voltage backup battery. The LVPDU of each low voltage domain can include logic and circuitry to control respective failsafe switches that couple the other two low voltage domains to the low voltage backup battery. Such an embodiment can further include other low voltage power domains that power non-safety critical peripherals.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A vehicle comprising:
   a first power distribution unit configured to distribute power to a first set of vehicle components within a first voltage domain;
   a second power distribution unit configured to distribute power to a second set of vehicle components within a second voltage domain;
   a shared backup battery configured to concurrently supply backup power to the first power distribution unit and to the second power distribution unit;
   a primary power source for supplying high voltage power;
   a voltage converter configured to convert the high voltage power from the primary power source to low voltage power, the low voltage power being received by the first power distribution unit and by the second power distribution unit; and wherein, while the shared backup battery concurrently supplies backup power to the first power distribution unit and to the second power distribution unit, the first power distribution unit is configured to generate a first control signal to selectively decouple the second power distribution unit from the shared backup battery and the second power distribution unit is configured to generate a second control signal to selectively decouple the first power distribution unit from the shared backup battery, and wherein the shared backup battery is shared by the first power distribution unit and the second power distribution unit, and wherein the shared backup battery is configured to concurrently supply backup power to the first power distribution unit and to the second power distribution unit in response to a fault associated with one or more of the primary power source or the voltage converter.

2. The vehicle of claim 1, further comprising one or more motors for propelling the vehicle, the one or more motors being configured to receive high voltage power from the primary power source.

3. The vehicle of claim 1, further comprising:
a main compute system configured to implement a set of primary autonomy functionalities to operate the vehicle in an autonomous or semi-autonomous manner; and
a secondary compute system configured to implement a set of backup autonomy functionalities.

4. The vehicle of claim 3, wherein a first portion of the secondary compute system is powered by the first power distribution unit and a second portion of the secondary compute is powered by the second power distribution unit.

5. The vehicle of claim 3, wherein the main compute system comprises a power input for receiving high voltage power from the primary power source.

6. The vehicle of claim 1, wherein the first set of vehicle components comprises a first set of sensors, a first set of one or more processors, and a first set of one or more wireless network interfaces for communicating with one or more remote computing systems; and
wherein the second set of vehicle components comprises a second set of sensors, a second set of one or more processors, and a second set of one or more wireless network interfaces for communicating with the one or more remote computing systems.

7. The vehicle of claim 1, wherein the first voltage domain and the second voltage domain are electrically isolated from one another.

8. The vehicle of claim 1, wherein first power distribution unit is configured to generate the first control signal to selectively decouple the second power distribution unit from the shared backup battery in response to detecting a fault condition associated with the second power distribution unit or with the second voltage domain; and
wherein second power distribution unit is configured to generate the second control signal to selectively decouple the second power distribution unit from the shared backup battery in response to detecting a fault condition associated with the first power distribution unit or with the first voltage domain.

9. The vehicle of claim 8, wherein the detecting the fault condition associated with the first power distribution unit or with the first voltage domain includes detecting one or more of an overcurrent condition, an over-temperature condition, an abnormal voltage condition, or a short circuit condition.

10. A computer-implemented method comprising:
monitoring, by a first power distribution unit of a vehicle, conditions associated with a second power distribution unit of the vehicle, wherein the first power distribution unit is configured to supply power to a first set of vehicle components within a first voltage domain and the second power distribution unit is configured to supply power to a second set of vehicle components within a second voltage domain, wherein the vehicle includes a primary power source for supplying high voltage power and a voltage converter configured to convert the high voltage power from the primary power source to low voltage power, the low voltage power being received by the first power distribution unit and by the second power distribution unit; monitoring, by the second power distribution unit, conditions associated with the first power distribution unit;

detecting, by the first power distribution unit, a first fault associated with the second power distribution unit; and in response to detecting the first fault associated with the second power distribution unit, generating, by the first power distribution unit, a control signal to decouple the second power distribution unit from a shared backup battery, the shared backup battery being shared by the first power distribution unit and the second power distribution unit, the shared backup battery being configured to supply power to the first power distribution unit and the second power distribution unit, and wherein the shared backup battery is shared by the first power distribution unit and the second power distribution unit, and, wherein the shared backup battery is arranged to concurrently supply backup power to the first power distribution unit and to the second power distribution unit when a fault is associated with one or more of the primary power source or the voltage converter.

11. The method of claim 10, wherein the shared backup battery is configured to concurrently supply power to the first power distribution unit and the second power distribution unit in the event of a fault associated with a primary power source of a vehicle or associated with a voltage converter of the vehicle.

12. The method of claim 10, further comprising:
detecting a second fault associated with a primary power source of a vehicle or associated with a voltage converter of the vehicle; and
in response to detecting the second fault and prior to detecting the first fault, (i) coupling the first power distribution unit and a second power distribution unit to the shared backup battery to enable the shared backup battery to concurrently supply backup power to the first power distribution unit and to the second power distribution unit, and (ii) decoupling the first power distribution unit and the second power distribution unit from the voltage converter.

13. The method of claim 10, wherein the first and second voltage domains are electrically isolated from each other.

14. The method of claim 10, wherein detecting the second fault associated with the second power distribution unit includes detecting one or more of an overcurrent condition, an over-temperature condition, an abnormal voltage condition, or a short circuit condition,
and wherein the shared backup battery is shared by the first power distribution unit and the second power distribution unit, and
in response to detecting a fault associated with one or more of the primary power source or the voltage converter, generate a control signal to concurrently supply backup power to the first power distribution unit and to the second power distribution unit.

15. A system configured to distribute power to a first set of electrical components within a first voltage domain, the system comprising:
control circuitry;
a primary power source for supplying high voltage power;
power regulation circuitry;
a failsafe switch configured to receive a first control signal to selectively decouple the first power distribution unit from a shared battery, the control circuitry, power regulation circuitry, and failsafe switch comprising a first power distribution unit, the shared battery concurrently supplying power to the first power distribution unit and to a second power distribution unit; and
a voltage converter configured to covert the high voltage power from the primary power source to low voltage power, the low voltage power being received by the first power distribution unit and by the second power distribution unit, wherein the control circuitry is configured to detect one or more fault conditions associated with the second power distribution unit and is further configured to, in response to detecting the one or more fault conditions, generate a second control signal to selectively decouple the second power distribution unit from the shared battery, and wherein the shared backup battery is shared by the first power distribution unit and the second power distribution unit, and wherein the shared backup battery is configured to concurrently supply backup power to the first power distribution unit and to the second power distribution unit in response to a fault associated with one or more of the primary power source or the voltage converter.

16. The system of claim 15, wherein the first control signal for selectively decoupling the first distribution unit from the shared battery is generated by the second power distribution unit.

17. The system of claim 15, wherein the first voltage domain is electrically isolated from a second voltage domain associated with the second power distribution unit.

18. The system of claim 15, wherein detecting the one or more fault conditions associated with the second power distribution unit comprises detecting one or more of an overcurrent condition, an over-temperature condition, or a short circuit condition.

* * * * *